(12) United States Patent
Gotou et al.

(10) Patent No.: US 6,494,253 B2
(45) Date of Patent: Dec. 17, 2002

(54) HEAT EXCHANGER

(75) Inventors: Takaharu Gotou, Yokohama (JP); Hiroyuki Yoshida, Sano (JP)

(73) Assignees: Nissan Motor Co., Ltd., Yokohama (JP); Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/015,674

(22) Filed: Dec. 17, 2001

(65) Prior Publication Data
US 2002/0088612 A1 Jul. 11, 2002

(30) Foreign Application Priority Data
Jan. 9, 2001 (JP) ........................................ 2001-001551

(51) Int. Cl.$^7$ ................................................ F28F 25/02
(52) U.S. Cl. ......................... 165/115; 165/174; 165/166
(58) Field of Search ................................ 165/159, 115, 165/173, 174, 166

(56) References Cited

U.S. PATENT DOCUMENTS

| | | | | |
|---|---|---|---|---|
| 4,216,002 A | * | 8/1980 | Rosenblad | 159/13.3 |
| 4,216,820 A | * | 8/1980 | Andrew | 165/110 |
| 4,505,879 A | * | 3/1985 | Lhonore et al. | 137/561 A |
| 4,969,507 A | * | 11/1990 | Rosenblad | 165/111 |
| 5,241,839 A | * | 9/1993 | Hughes | 165/174 |
| 5,242,016 A | * | 9/1993 | Voss et al. | 165/173 |
| 5,415,223 A | * | 5/1995 | Reavis et al. | 165/159 |
| 5,709,264 A | * | 1/1998 | Sweeney et al. | 165/115 |

FOREIGN PATENT DOCUMENTS

| | | |
|---|---|---|
| JP | 9-79694 | 3/1997 |
| JP | 2000-111244 | 4/2000 |

* cited by examiner

*Primary Examiner*—Allen Flanigan
(74) *Attorney, Agent, or Firm*—Foley & Lardner

(57) ABSTRACT

A body (6) of a heat exchanger is provided with a plurality of heat receiving fluid passages (10A) having openings directed upward. A header (1) is fitted to the top of the body (6). The header (1) has a bottom plate (1B) having a plurality of through holes (4) communicating with the openings of the passages (10A), a top plate (1A) fixed to the bottom plate (1B). In the header (1), a plurality of fluid passages (5) communicating with the through holes (4) and a fuel distribution space (8) communicating with the fluid conducting passages (5) are partitioned. By supplying heat receiving fluid from a fuel supply member (3) fixed to a lateral face of the header (1) to the fuel distribution space (8), the heat receiving fluid is supplied to the heat receiving fluid passages (10A) quickly and uniformly.

18 Claims, 7 Drawing Sheets

HEAT EXCHANGER

FIELD OF THE INVENTION

This invention relates to a heat exchanger applied to, for example, a vaporizer for a fuel cell system.

BACKGROUND OF THE INVENTION

Tokkai Hei 9-79694 issued by the Japanese Patent Office in 1997 discloses a heat exchanger provided with a plurality of fuel supply nozzles on a header to uniformly distribute liquid in the heat exchanger.

Tokkai 2000-111244 issued by the Japanese Patent Office in 2000 discloses a heat exchanger provided with a liquid distribution layer made of sintered material or a liquid distribution layer using a serrated fin on the bottom surface of a box type container for the same purpose.

The container is disposed on the top of the main body of the heat exchanger. The liquid distribution layer of the above construction allows liquid in the container to drop uniformly to the main body of the heat exchanger.

SUMMARY OF THE INVENTION

The former device requires a large space for mounting nozzles on the header, as a result, the header becomes larger. In the latter device, because a lag time is generated between start and stop of liquid supply to the container, and start and stop of operation of the heat exchanger due to a considerable amount of liquid stored in the liquid distribution layer and in the container, the control response of the heat exchanger is poor.

It is therefore an object of this invention to provide a compact liquid supply mechanism for a heat exchanger which has a good response in liquid supply control.

In order to achieve the above object, this invention provides a heat exchanger comprising a body in which a plurality of heat rendering fluid passages in which heat rendering fluid flows and a plurality of heat receiving fluid passages in which heat receiving fluid flows are formed, a header disposed on the top of the body, and a fuel supply member fitted to a lateral face of the header.

The heat receiving fluid passages have openings directed upward. The header comprises a bottom plate having a plurality of through holes communicating with the openings of the heat receiving fluid passages, and a top plate fixed to the bottom plate. The bottom plate and the top plate partitions a plurality of fluid conducting passages communicating with the through holes and a fluid distribution space communicating with the fluid conducting passages therebetween. The fuel supply member supplies the heat receiving fluid to the fluid distribution space.

The details as well as other features and advantages of this invention are set forth in the remainder of the specification and are shown in the accompanying drawings.

DESCRIPTION OF THE PREFERRED EMBODIMENTS

Figure 1:
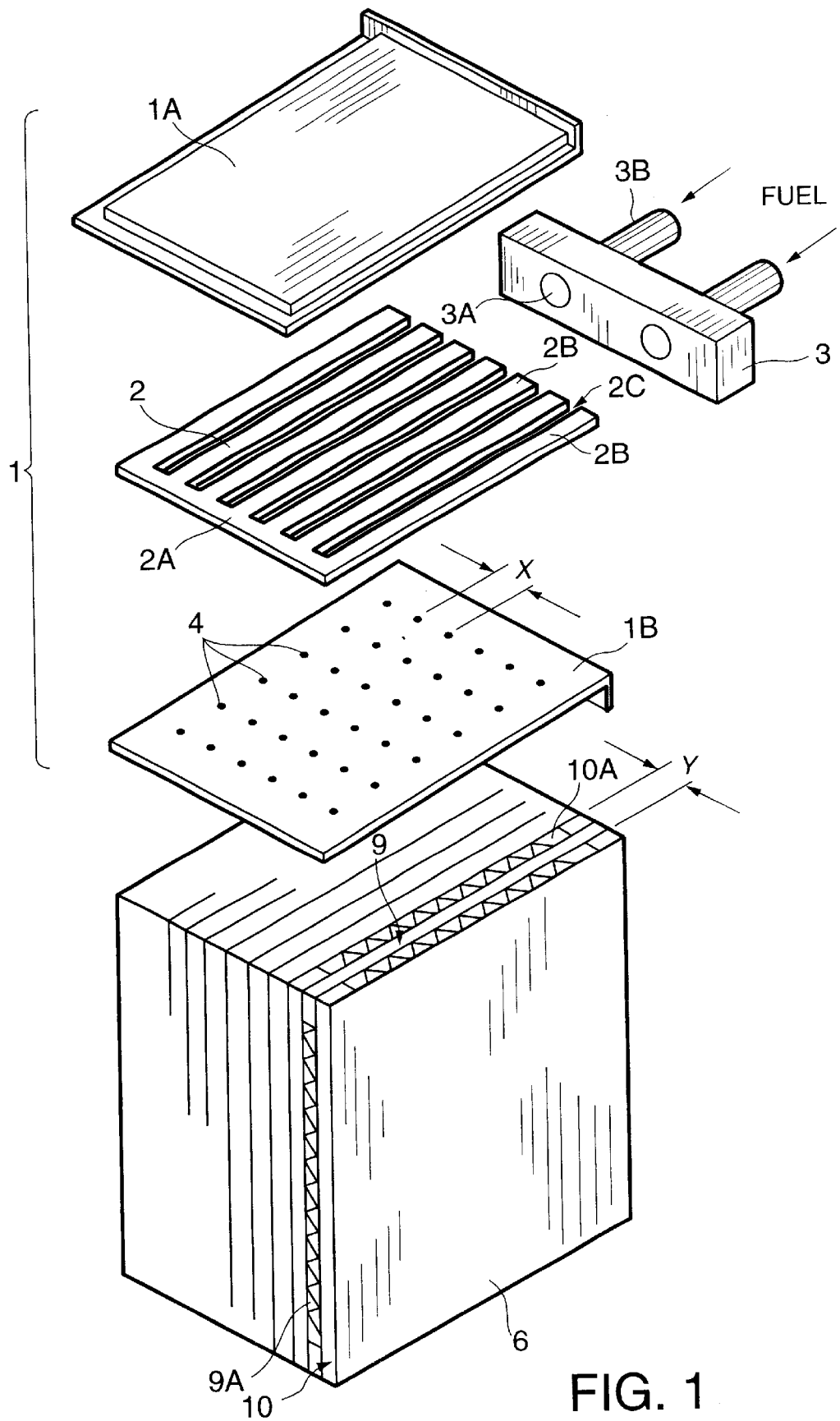
FIG. 1 is a split perspective view of a heat exchanger according to this invention.

Referring to FIG. 1 of the drawings, a heat exchanger according to this invention is presented as a vaporizer for a fuel cell power plant which vaporizes fuel such as gasoline and methanol by heat exchange with combustion gas. The heat exchanger comprises a heat exchanger body 6, a header 1 mounted on the upper end of the heat exchanger body 6 and a fuel supply member 3 fitted to a lateral side of the header 1.

The header 1 comprises a top plate 1A, a bottom plate 1B and a comb-shaped plate 2.

Figure 2:
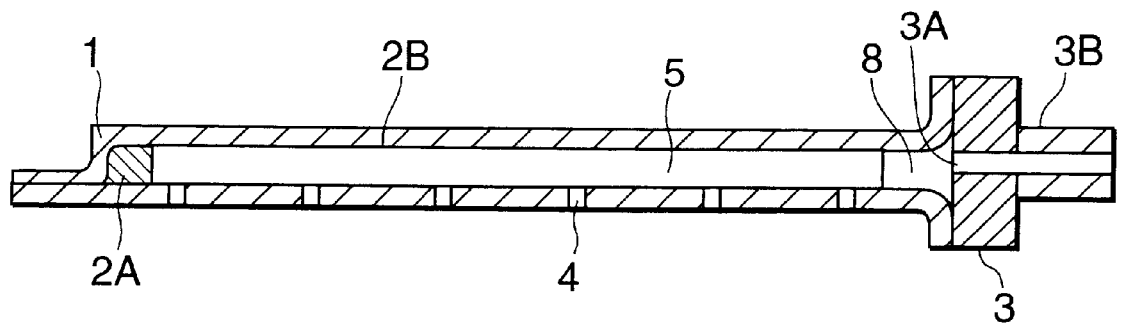
FIG. 2 is a longitudinal sectional view of a header of the heat exchanger.

Referring to FIG. 2, the top plate 1A and bottom plate 1B are mutually coupled by welding or soldering while sandwiching the comb-shaped plate 2 from the upper and lower directions respectively. The comb-shaped plate 2 has a plurality of parallel arms 2B. An end of each arm 2B is fixed to coupling member 2A extending at right angles to the arms 2B. A space 2C is formed between adjacent arms 2B. The fuel supply member 3 tightly seals the opening formed on a lateral face of the header 1 positioned to face another end of each arm 2B. The lengths of the arms 2B are set so that a fuel distribution space 8 is formed between the end of the arms 2B and the fuel supply member 3. The thickness of the comb-shaped plate 2 is approximately one millimeter. The thickness in the vertical direction of the header 1, therefore, becomes thinner compared with the above-mentioned prior art devices.

By sandwiching the comb-shaped plate 2 with the top plate 1A and bottom plate 1B, each space 2C forms a fuel conducting passage 5 in the direction along the cross-section of the header 1 shown in FIG. 2. Each fuel conducting passage 5 communicates with the fuel distribution space 8. The width of the fuel conducting passage 5 is preferably the minimum value possible that meets the fuel supply amount from the header 1 to the heat exchanger body 6. On the basis of this condition, the width of the arm 2B is determined.

Referring to FIG. 1 again, the fuel supply member 3 is provided with two fuel outlets 3A opening toward the inside of the header 1. The fuel outlets 3A are connected to a fuel pump via two connecting pipes 3B projecting in the opposite direction of the fuel outlets 3A from the fuel supply member 3.

The bottom plate 1B is provided with through holes 4 equally spaced at positions facing each fuel conducting passage 5.

Figure 3:
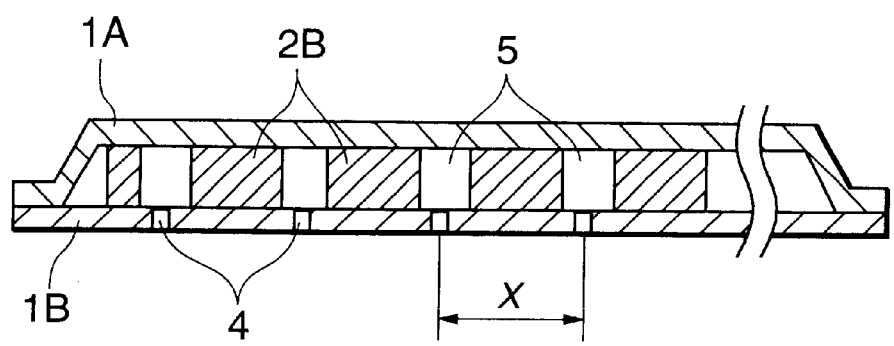
FIG. 3 is a cross-sectional view of the header.

Referring to FIG. 3, the intervals X of the through holes 4 in the direction orthogonal to the center lines of each fuel conducting passage 5 are set to be equal to the interval of the center lines of the fuel conducting passages 5.

By the above constitution, liquid fuel discharged from the fuel outlets 3A of fuel supply member 3 to the space 8 is uniformly distributed from the space 8 to the fuel conducting passage 5. The fuel flows down via each fuel conducting passage 5, and drops from the through holes 4 to heat exchanger body 6.

Referring to FIG. 1 again, the heat exchanger body 6 comprises high temperature fluid layers 9 through which high temperature fluid horizontally passes and low temperature fluid layers 10 through which low temperature fluid vertically passes. The high temperature fluid layer 9 and the low temperature layer 10 are alternatively accumulated horizontally in the heat exchanger body 6. The intervals Y of the low temperature fluid layers 10 are set to be equal to the lateral intervals X of the through holes 4, in other words, the intervals of the center of the fuel conducting passages 5, and the heat exchanger body 6 is constituted so that the low temperature fluid layers 10 are positioned below the through holes 4.

The low temperature fluid layer 10 and the high temperature fluid layer 9 are insulated by a partition. In the low temperature fluid layers 10, there are many vertical passages 10A partitioned by a corrugated sheet. In the high temperature fluid layers 9, there are many horizontal passages 9A partitioned by a corrugated sheet. High temperature gas such as combustion gas of fuel is supplied to one end of each passage 9A. The high temperature gas passes through each passage 9A, and is discharged from the other end of each passage 9A. And, heat of the high temperature gas flowing through each passage 9A heats up the low temperature fluid layers 10. Fuel dropped from the through holes 4 into the passages 10A in the low temperature fluid layers 10 vaporizes in the process of flowing down in the passages 10A due to the heat received from the high temperature layers 9, and discharged from the lower ends of passages 10A in the form of gas.

In this heat exchanger, only comb-shaped plate 2 with a thickness of approximately one millimeter is housed in the header 1, therefore, the size of the header 1 can be made small. In addition, because the retaining space of fuel in the header 1 is small, liquid fuel supplied from the outlet 3A of the fuel supply member 3 to the header 1 drops into the heat exchanger body 6 from the through holes 4 in a short time, and the lag time from the start of liquid fuel supply to the start of the fuel vaporization in the heat exchanger body 6 and the lag time from the stop of liquid fuel supply to the stop of the fuel vaporization in the heat exchanger body 6 are also short. Therefore, the heat exchanger has a high control response.

Figure 4:
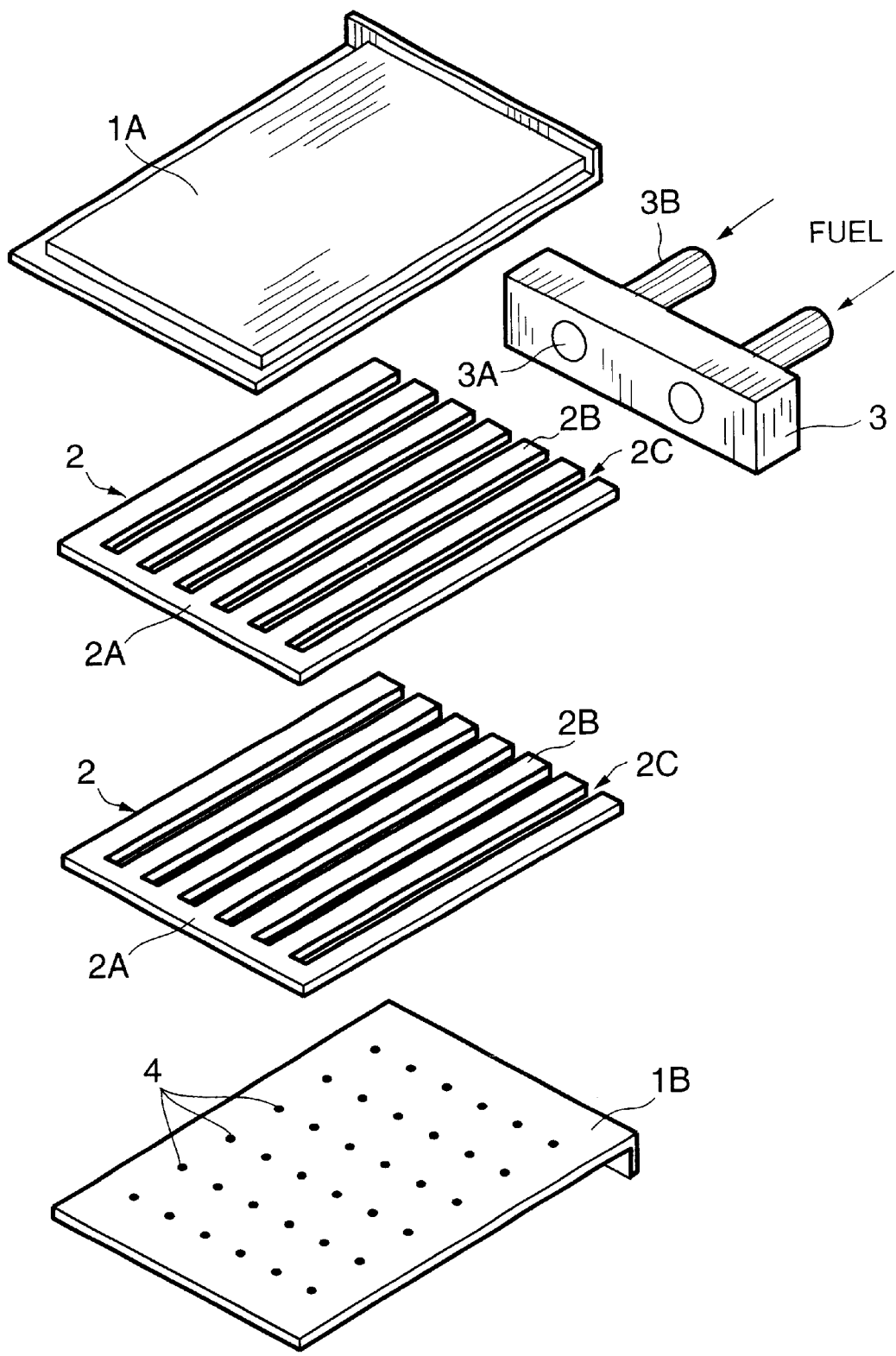
FIG. 4 is a split perspective view of the header according to a second embodiment of this invention.
Figure 5:
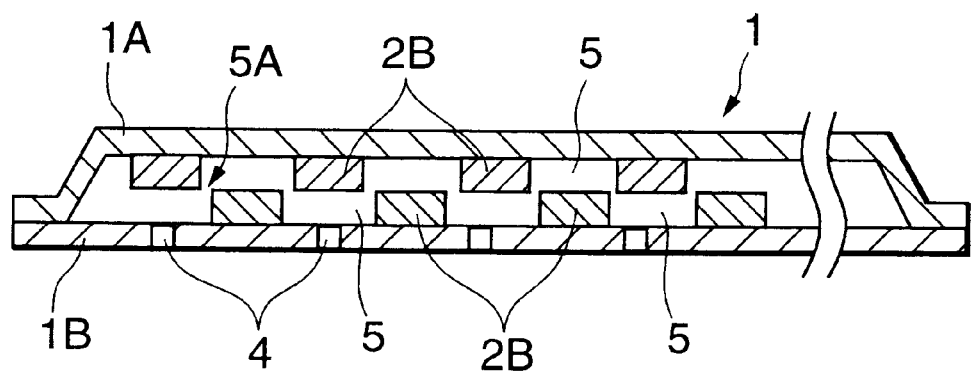
FIG. 5 is a cross sectional view of the header according to the second embodiment of this invention.

Referring to FIGS. 4 and 5, a second embodiment of this invention related to the structure of the header 1 will now be described.

In this embodiment, the comb-shaped plates 2 are laminated at two levels, and are sandwiched by the top plate 1A and bottom plate 1B.

Referring to FIG. 5, the arms 2B of the upper and lower comb-shaped plates 2 are alternately positioned horizontally, and a gap 5A is formed between the arms 2B.

Thus, a fuel conducting passage 5 formed between adjacent arms 2B of one comb-shaped plate 2 mutually communicate with a fuel conducting passage 5 formed between adjacent arms 2B of the other comb-shaped plate 2 via the gap 5A.

According to this embodiment, the liquid fuel flowing into the header 1 from the fuel supply member 3 not only moves along the fuel conducting passages 5, but can also flow in the lateral direction, thereby, enhancing the fuel uniform distribution function of the header 1.

Figure 7:
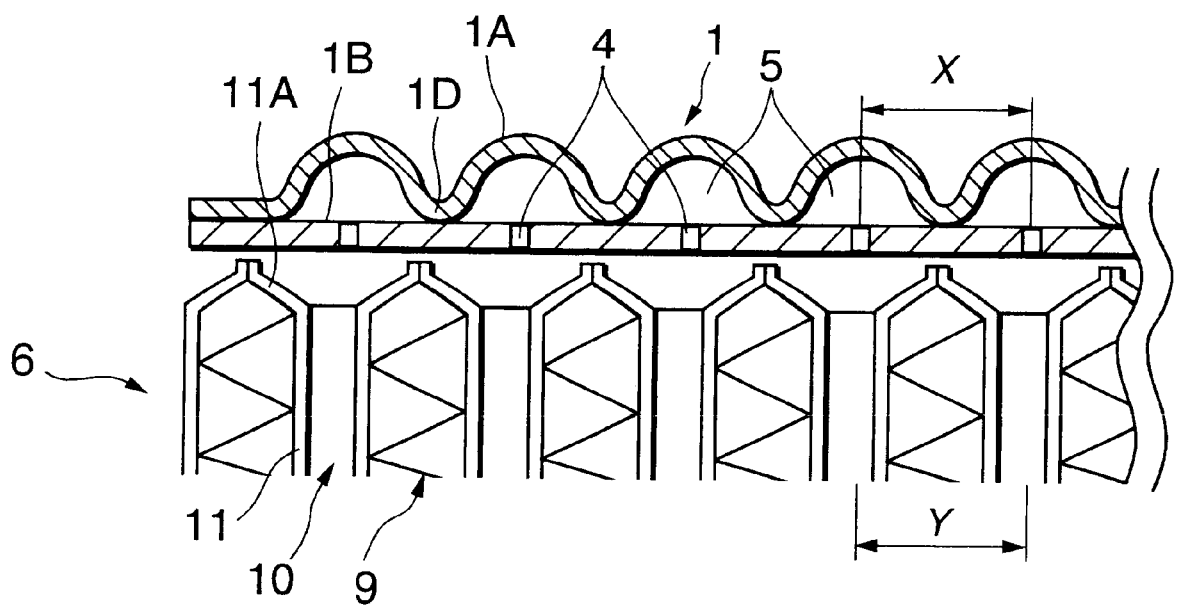
FIG. 7 is a cross-sectional view of the header and essential parts of the heat exchanger according the third embodiment of this invention.
Figure 6:
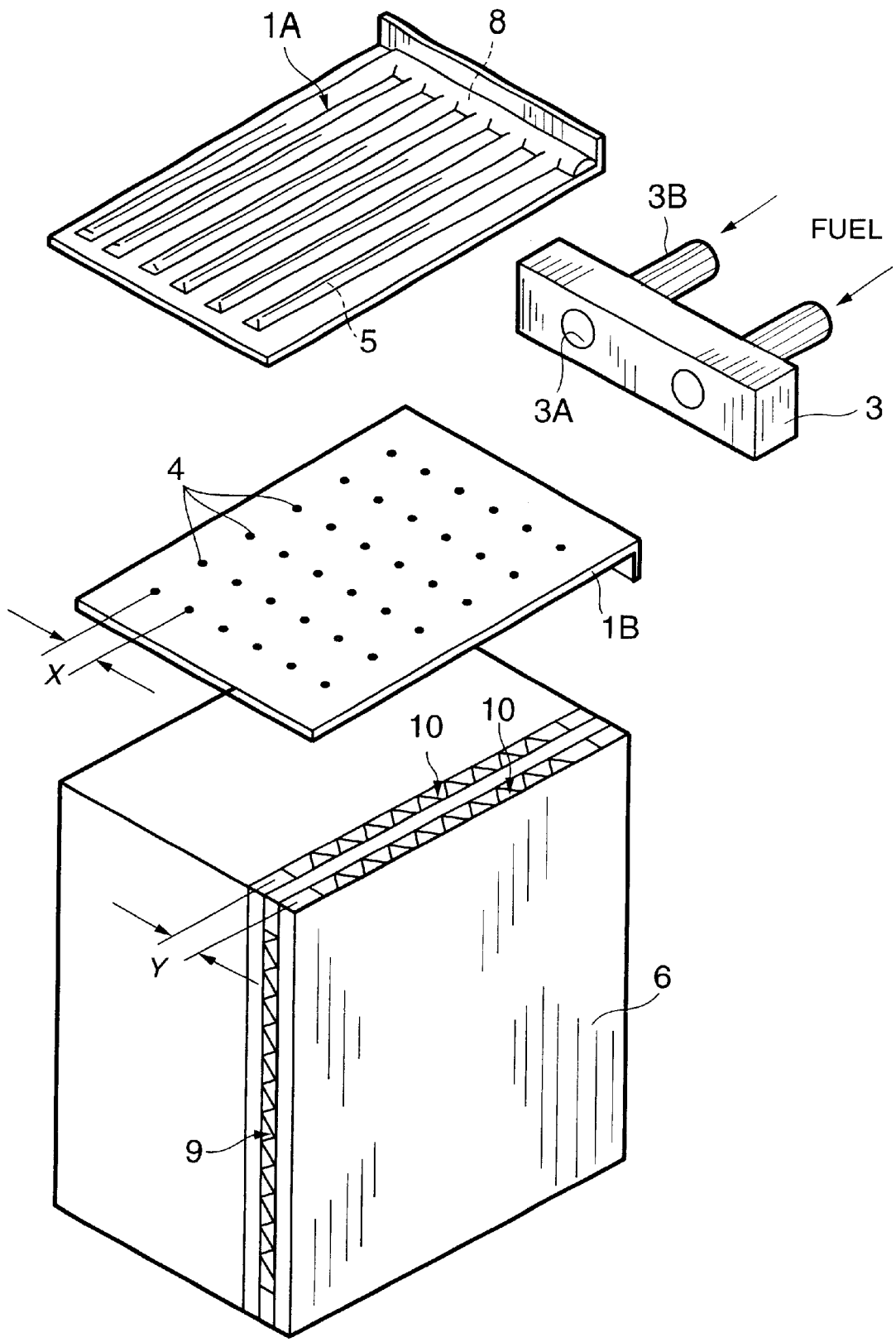
FIG. 6 is similar to FIG. 1, but showing a third embodiment of this invention.
Figure 8:
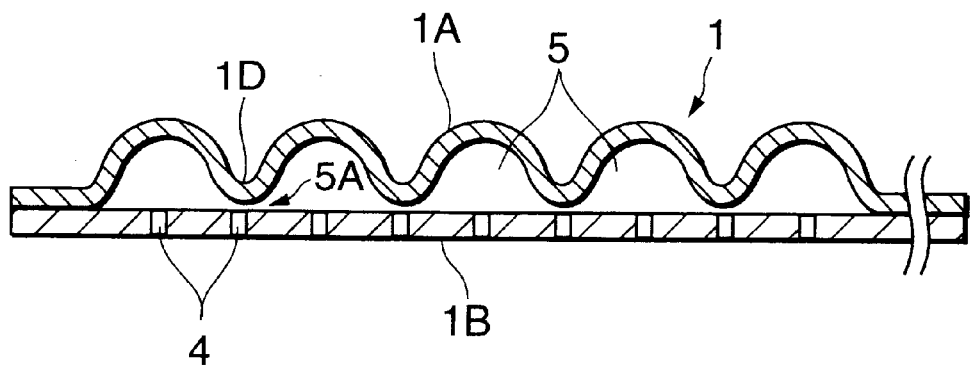
FIG. 8 is a cross-sectional view of the header showing a possible variation of the header configuration, according to the third embodiment of this invention.

Referring to FIGS. 6 through 8, a third embodiment of this invention related to the structure of the header 1 will be described. The header 1 according to this embodiment comprises a top plate 1A, bottom plate 1B and fuel supply member 3 as shown in FIG. 6.

The top plate 1A is constituted with a press molded corrugated steel sheet, and is fixed to the bottom plate 1B by welding or soldering as in the first embodiment.

In the header 1, a plurality of fuel conducting passages 5 are partitioned between the corrugated steel sheet and the bottom plate 1B.

In addition, at the upstream end of the fuel conducting passages 5, a fuel distribution space 8 extending in the lateral direction is formed by press molding similar to the fuel conducting passages 5. As shown in FIG. 7, the bottom 1D of the corrugation contacts with the bottom plate 1B to partition adjacent fuel conducting passages 5. The fuel distribution space 8 communicates with the outlets 3A of the fuel supply member 3 and respective fuel passages 5. The downstream end of each fuel conducting passage 5 is closed also by press molding. As in the first embodiment, the intervals of center of the fuel passages 5 are set to be equal to the intervals of the low temperature fluid layers 10 of the heat exchanger body 6.

In the heat exchanger body 6, inclined surfaces 11A are formed on the upper end of the partitions 11 partitioning the high temperature fluid layers 9 and low temperature fluid layers 10 as shown in FIG. 7. The inclined surfaces 11A quickly direct liquid fuel dropping from the through holes 4 to the low temperature fluid layers 10.

In this embodiment, the liquid fuel supplied from the outlets 3A into the header 1 is also distributed from the fuel distribution space 8 to respective fuel passages 5, flows through the through holes 4 from respective fuel passages 5 and drops into the low temperature fluid layers 10 of the header 1.

According to this embodiment, the comb-shaped plate 2 can be omitted, therefore, the number of parts constituting the header can be decreased. Rigidity of the header 1 can also be enhanced by the top plate 1 press-molded in a corrugated shape.

As shown in FIG. 8, it is also possible to provide a gap 5A between the bottom 1D of each corrugation of the top plate 1A and the bottom plate 1B and allow flowing of fuel between the fuel passages 5. In this case, it is not required to align the position of the through holes 4 on the center of the fuel passages 5, therefore, as shown in the figure, the through holes 4 can be formed at any position containing the position directly under the bottom 1D of the corrugation.

Figure 10:
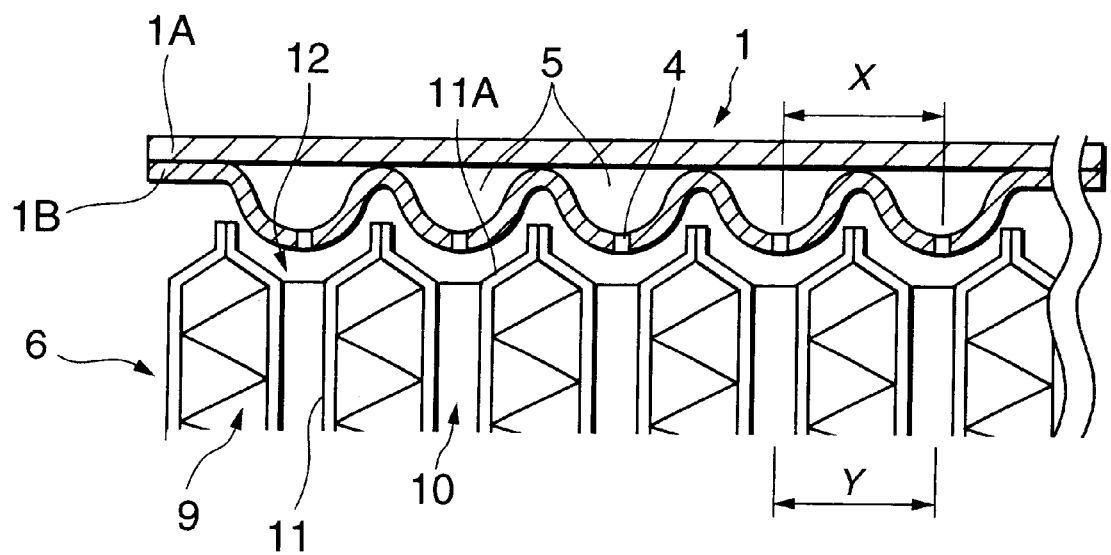
FIG. 10 is a cross-sectional view of the header and essential parts of the heat exchanger according to the fourth embodiment of this invention.
Figure 9:
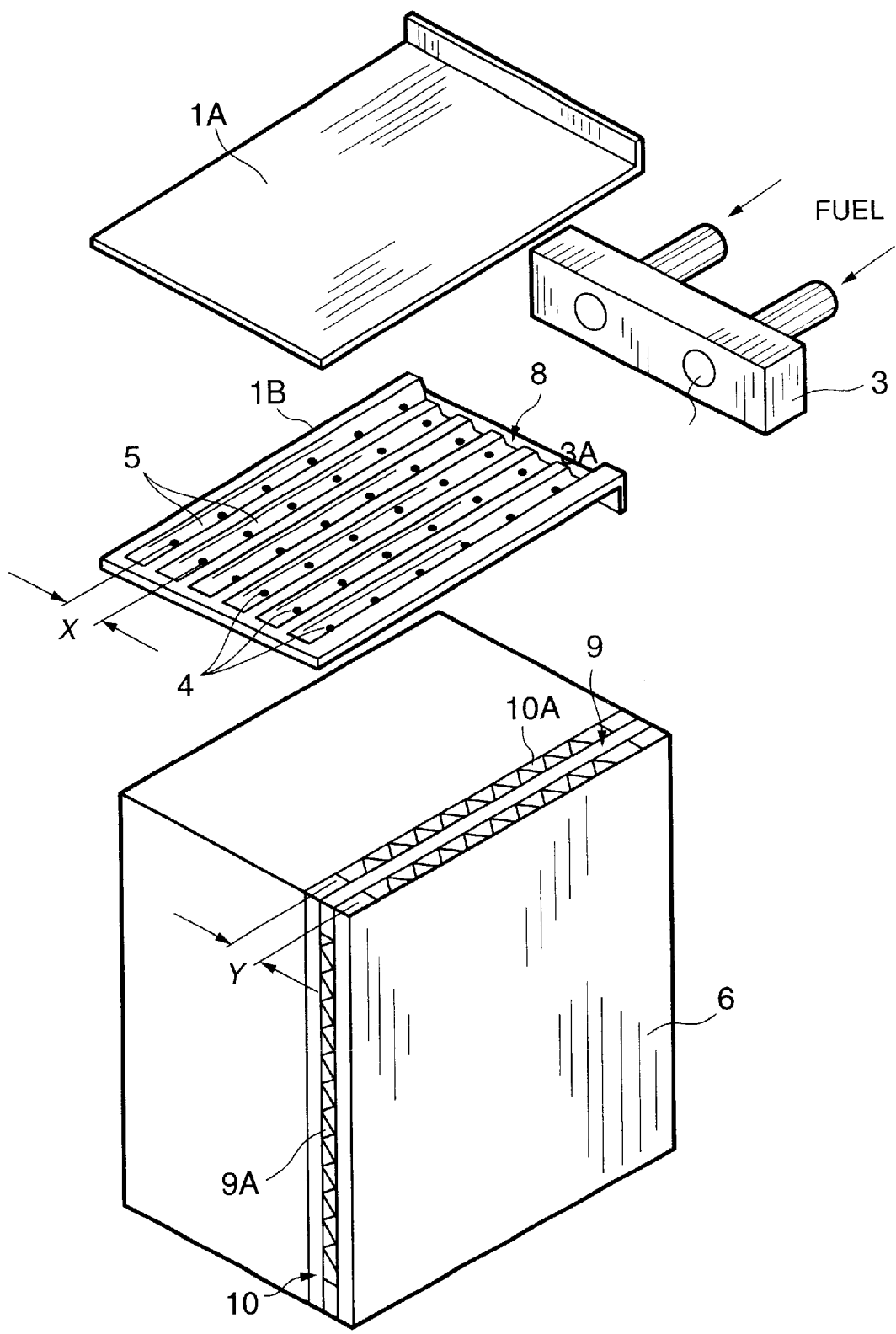
FIG. 9 is similar to FIG. 1, but showing a fourth embodiment of this invention.

Referring to FIGS. 9 and 10, a fourth embodiment of this invention related to the structure of the header 1 will be described.

In this embodiment, while the bottom plate 1A is formed in a corrugated cross-section similar to that of the top plate 1A of the third embodiment, the top plate 1A is constituted by a flat sheet. In other words, this embodiment is equivalent to turning upside down the header 1 of the third embodiment. The through holes 4 are formed at the bottom of the corrugation of the bottom plate 1A with equal intervals. As shown in FIG. 10, the heat exchanger body 6 is provided with inclined surfaces 11A formed at the upper end of the partitions 11, similar to those of the third embodiment. The shape and dimensions of corrugation are set so that the bottom of the corrugation is housed in a recess 12 formed by adjacent two inclined surfaces 11A.

According to this embodiment, the same effect as in the third embodiment can be obtained. In addition, vertical dimensions of the header 1 can be further decreased.

The contents of Tokugan 2001-1551, with a filing date of Jan. 9, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A heat exchanger comprising:
    a body in which a plurality of heat rendering fluid passages in which heat rendering fluid flows and a plurality of heat receiving fluid passages in which heat receiving fluid flows are formed, the heat receiving fluid passages having openings directed upward;
    a header disposed on the top of the body, the header comprising a bottom plate and a top plate fixed to the bottom plate, the bottom plate and the top plate partitioning therebetween a plurality of fluid conducting passages of substantially equal length and a fluid distribution space communicating with the fluid conducting passages, the bottom plate having a plurality of through holes located under each of the fluid passages and communicating therewith; and
    a supply member fitted to a lateral face of the header for supplying the heat receiving fluid to the fluid distribution space.

2. The heat exchanger as defined in claim 1, wherein the fluid conducting passages are arranged in parallel to a supplying direction of the heat receiving fluid from the fuel supply member to the fluid distribution space.

3. The heat exchanger as defined in claim 1, wherein the fluid conducting passages are partitioned by a comb-shaped plate having a plurality of parallel arms and is sandwiched between the top plate and the bottom plate.

4. The heat exchanger as defined in claim 1, wherein the header is further provided with a gap communicating with two fluid passages adjacent to each other.

5. The heat exchanger as defined in claim 1, wherein the heat receiving fluid passages are formed in heat receiving layers laminated in a horizontal direction at a predetermined interval, and the fluid conducting passages are arranged at an interval identical to the interval of the heat receiving layers.

6. The heat exchanger comprising:
    a body in which a plurality of heat rendering fluid passages in which heat rendering fluid flows and a plurality of heat receiving fluid passages in which heat receiving fluid flows are formed, the heat receiving fluid passages having openings directed upward;
    a header disposed on the top of the body, the header comprising a bottom plate having a plurality of through holes communicating with the openings of the heat receiving fluid passages and a top plate fixed to the bottom plate, the bottom plate and the top plate partitioning a plurality of fluid conducting passages communicating with the through holes and a fluid distribution space communicating with the fluid conducting passages therebetween; and
    a supply member fitted to a lateral face of the header and supplies the heat receiving fluid to the fluid distribution space, wherein a gap communicating with two fluid passages adjacent to each other is formed in the header, the fluid conducting passages are partitioned by an upper comb-shaped plate and a lower comb-shaped plate laminated vertically between the top plate and the bottom plate, each of the upper comb-shaped plate and the lower comb-shaped plate has a plurality of parallel arms and the gap is formed between an arm of the upper comb-shaped plate and an arm of the lower comb-shaped plate.

7. The heat exchanger as defined in claim 6, wherein the fluid conducting passages are arranged in parallel to a supplying direction of the heat receiving fluid from the supply member to the fluid distribution space.

8. The heat exchanger as defined in claim 6, wherein the heat receiving fluid passages are formed in heat receiving layers laminated in a horizontal direction at a predetermined interval, and the fluid conducting passages are arranged at an interval identical to the interval of the heat receiving layers.

9. A heat exchanger comprising:
    a body in which a plurality of heat rendering fluid passages in which heat rendering fluid flows and a plurality of heat receiving fluid passages in which heat receiving fluid flows are formed, the heat receiving fluid passages having openings directed upward;
    a header disposed on the top of the body, the header comprising a bottom plate having a plurality of through holes communicating with the openings of the heat receiving fluid passages and a top plate fixed to the bottom plate, the top plate comprising a corrugated sheet with corrugated surfaces, the corrugated surfaces and the bottom plate partitioning a plurality of fluid conducting passages communicating with the through holes, a fluid distribution space communicating with the fluid conducting passages being formed between the top plate and the bottom plate; and
    a supply member fitted to a lateral face of the header and supplies the heat receiving fluid to the fluid distribution space.

10. The heat exchanger as defined in claim 9, wherein the fluid conducting passages are arranged in parallel to a supplying direction of the heat receiving fluid from the supply member to the fluid distribution space.

11. The heat exchanger as defined in claim 9, wherein the header is further provided with a gap communicating with two fluid passages adjacent to each other.

12. A heat exchanger comprising:
    a body in which a plurality of heat rendering fluid passages in which heat rendering fluid flows and a plurality of heat receiving fluid passages in which heat receiving fluid flows are formed, the heat receiving fluid passages having openings directed upward;
    a header disposed on the top of the body, the header comprising a bottom plate having a plurality of through holes communicating with the openings of the heat receiving fluid passages and a top plate fixed to the bottom plate, the bottom plate comprising a corrugated sheet with corrugated surfaces, the corrugated surfaces and the top plate partitioning a plurality of fluid conducting passages communicating with the through holes, a fluid distribution space communicating with the fluid conducting passages being formed between the top plate and the bottom plate; and
    a supply member fitted to a lateral face of the header and supplies the heat receiving fluid to the fluid distribution space.

13. The heat exchanger as defined in claim 12, wherein the fluid conducting passages are arranged in parallel to a supplying direction of the heat receiving fluid from the supply member to the fluid distribution space.

14. The heat exchanger as defined in claim 12, wherein the header is further provided with a gap communicating with two fluid passages adjacent to each other.

15. The heat exchanger as defined in claim 12, wherein the body further comprises inclined surfaces directing the heat receiving fluid dropping from the through holes to the heat receiving fluid passages.

16. The heat exchanger as defined in claim 15, wherein each of the inclined surfaces is formed on a partition which partitions one of the heat rendering fluid passages and one of the heat receiving fluid passages, the bottom plate comprises a corrugated sheet having a bottom projecting downwardly and housed in a recess formed by adjacent inclined surfaces.

17. The heat exchanger as defined in claim 12, wherein the heat receiving fluid passages are formed in heat receiving layers laminated in a horizontal direction at a predetermined interval, and the fluid conducting passages are arranged at an interval identical to the interval of the heat receiving layers.

18. A heat exchanger comprising:
- a body in which a plurality of heat rendering fluid passages in which heat rendering fluid flows and a plurality of heat receiving fluid passages in which heat receiving fluid flows are formed, the heat receiving fluid passages having openings directed upward;
- a header disposed on the top of the body, the header comprising a bottom plate having a plurality of through holes communicating with the openings of the heat receiving fluid passages and a top plate fixed to the bottom plate, the top plate having a corrugated surface which, together with the bottom plate, partitions in the header a plurality of fluid conducting passages communicating with the through holes and a fluid distribution space communicating with the fluid conducting passages, an interval of the fluid conducting passages being set to be equal to an interval of the through holes; and
- a supply member fitted to a lateral face of the header for supplying the heat receiving fluid to the fluid distribution space.

* * * * *